Figure 1:
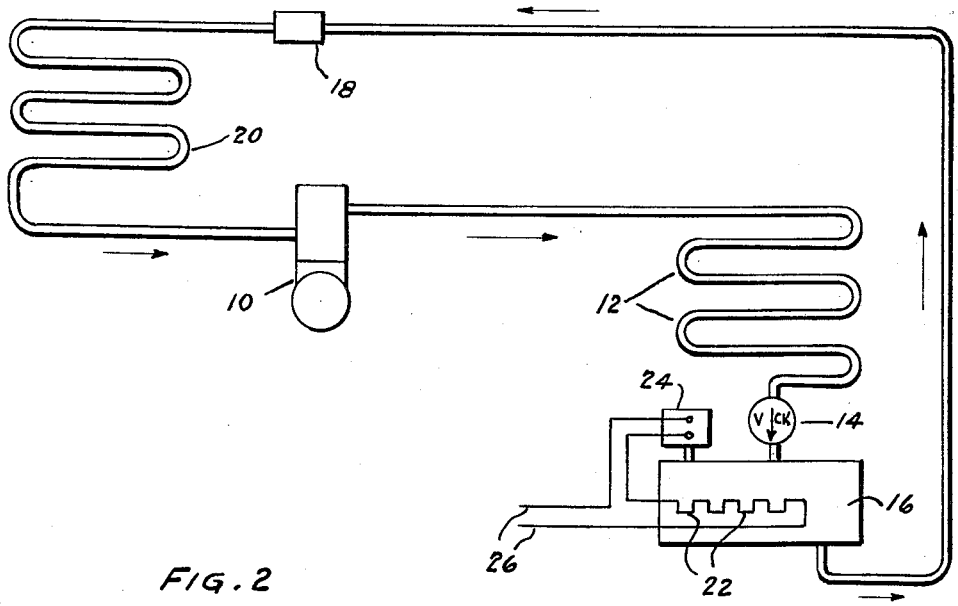

March 26, 1963
A. T. MARLO
METHOD AND APPARATUS FOR CONTROLLING PRESSURE ENTERING REFRIGERANT FLOW DEVICE
Filed Feb. 24, 1959

3,082,610

INVENTOR
ANGELO T. MARLO
BY Roy Eilers ATT'Y.

United States Patent Office 3,082,610
Patented Mar. 26, 1963

3,082,610
METHOD AND APPARATUS FOR CONTROLLING PRESSURE ENTERING REFRIGERANT FLOW DEVICE
Angelo T. Marlo, St. Louis County, Mo., assignor to Marlo Coil Company, St. Louis, Mo., a corporation of Missouri
Filed Feb. 24, 1959, Ser. No. 794,941
10 Claims. (Cl. 62—113)

This invention relates to improvements in heat exchangers. More particularly, this invention relates to improvements in methods and apparatus for controlling the pressure at the entering port of a refrigerant flow control.

It is therefore an object of the present invention to provide an improved method and apparatus for controlling the pressure at the entering port of a refrigerant flow control.

Refrigerant flow controls, such as expansion valves, capillary tubes and the like, operate most efficiently when the fluctuation of the pressures at their inlet and outlet ports are not unduly great; and consequently it is desirable to control the pressures at the inlet ports of refrigerant flow controls to keep those pressures from falling too low. Where the refrigerant flow controls are used in compression-expansion refrigeration systems, it will be desirable to keep the liquid pressures in the receivers of those systems from falling to unduly low levels. Where the condensers of the refrigeration systems are cooled by water, it is easy to keep the liquid pressures in the receivers of those systems from falling too low; but where the condensers of those systems are cooled by air, it is not always easy to keep the liquid pressures in the receivers of those systems from falling too low. Yet, the progressive scarcity and high cost of water for cooling the condensers of refrigeration systems makes the use of air-cooled condensers for such systems progressively more desirable. Consequently it would be desirable to provide a method and apparatus for keeping the liquid pressure in the receiver of an air-cooled refrigeration system from falling to too low a level. The present invention provides such a method and apparatus; and it is therefore an object of the present invention to provide a method and apparatus for maintaining the liquid pressure in the receiver of an air-cooled refrigeration system above a predetermined minimum level.

The present invention keeps the liquid pressure in the receiver of an air-cooled refrigeration system above a predetermined minimum level by supplying heat to the refrigerant in that receiver whenever the temperature or the pressure of that refrigerant falls too far. That heat will warm the refrigerant within that receiver and thereby enable that refrigerant to increase the liquid pressure within that receiver. It is therefore an object of the present invention to provide a method and apparatus for supplying heat to the refrigerant in the receiver of an air-cooled refrigeration system to maintain the liquid pressure in that receiver above a predetermined level.

The present invention provides a valve intermediate the condenser and the receiver of the refrigeration system, and that valve can be closed whenever heat is supplied to the refrigerant in that receiver. The closing of that valve isolates the receiver from the condenser and thereby enables a small amount of heat to appreciably raise the pressure within the receiver. Without that valve, the refrigerant in the condenser as well as the refrigerant in the receiver would have to be warmed; and this would require excessive amounts of heat. It is therefore an object of the present invention to provide a valve that is intermediate the receiver and the condenser of an air-cooled refrigeration system and that can be closed during the heating of the refrigerant in that receiver.

The valve intermediate the receiver and condenser of the air-cooled refrigeration system will preferably be a check valve; because such a valve can normally permit free flow of refrigerant from the condenser into the receiver and then close to prevent the flow of refrigerant from the receiver into the condenser. Furthermore, that check valve can automatically close, whenever the heat supplied to the refrigerant in the receiver increases the liquid pressure in that receiver, and thereby isolate that receiver from the condenser. That check valve will then remain closed until the pressure in the condenser rises to the point where it exceeds the pressure in the receiver. It is therefore an object of the present invention to provide a check valve intermediate the condenser and receiver of an air-cooled refrigeration system.

After the check valve has closed, continued operation of the refrigeration system will continue to introduce gaseous refrigerant into the condenser. That refrigerant will condense to liquid and will progressively occupy more and more of the space within the condenser, thereby reducing the area that can absorb heat from further incoming gaseous refrigerant. As a result, the pressure within the condenser will rise, even though the temperature of the ambient air is quite cool. When that pressure exceeds the pressure within the receiver, the check valve will open and permit further liquid refrigerant to flow from the condenser into the receiver. The introduction of that further liquid refrigerant into the receiver will further increase the liquid pressure within the receiver, thereby making it unnecessary to supply further heat to the refrigerant in that receiver. However, in the event the liquid pressure within the receiver again falls too far, heat will once again be supplied to the refrigerant in the receiver and the check valve will close once again. In this way, the liquid pressure in the receiver will be kept from falling to too low a level.

In one embodiment of the present invention, the heat is supplied to the refrigerant in the receiver by an electrical heating element. In another embodiment of the present invention, that heat is supplied by hot, gaseous refrigerant; but in both embodiments the heat will keep the liquid pressure in the receiver from falling too far.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

Figure 2:
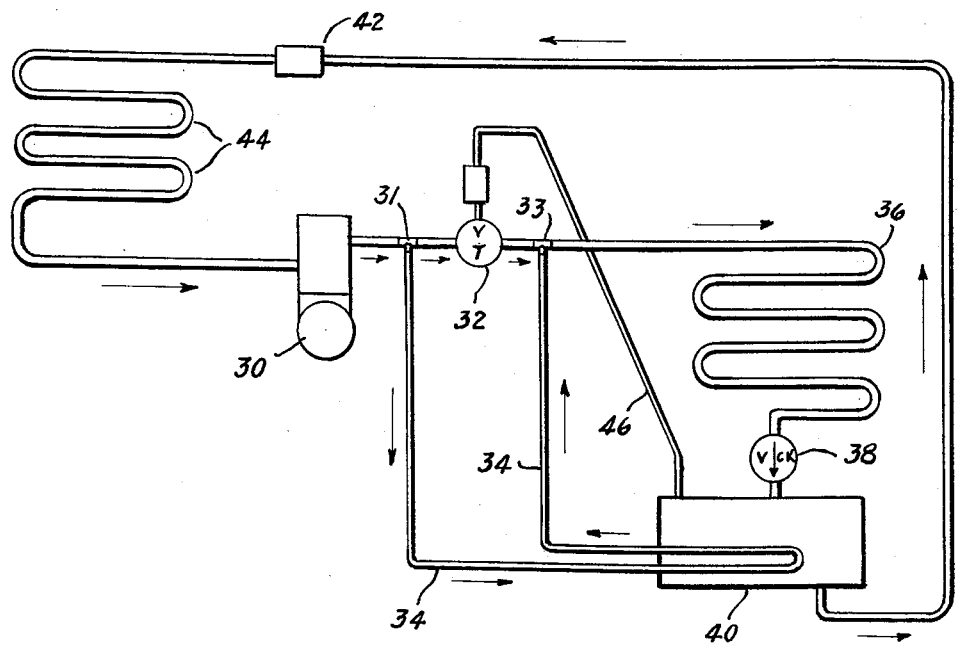

In the drawing,

FIG. 1 is a diagrammatic view of an air-cooled compression-expansion system that is equipped with a preferred form of control provided by the present invention, and FIG. 2 is a schematic diagram of another air-cooled compression-expansion system that is equipped with a second preferred form of control provided by the present invention.

Referring to the drawing in detail, the numeral 10 denotes a standard refrigeration compressor. A high pressure line extends from the outlet port of that compressor to the inlet of an air-cooled condenser 12. A check valve 14 is connected to the outlet of the condenser 12, and that check valve normally permits liquid refrigerant to drain from the condenser outlet and enter a receiver 16. However, that check valve can respond to increases in the pressure of the refrigerant within the receiver to close and prevent further draining of liquid refrigerant from the condenser outlet into the receiver 16, and it will simultaneously prevent any flow of refrigerant from the receiver 16 back into the condenser 12. The valve 14 can be any one of a number of standard, commercially-available check valves.

A high pressure line extends from the outlet of receiver 16 to the inlet port of a refrigerant flow control 18. That refrigerant flow control can be an expansion valve, a capillary tube, or any standard refrigerant flow control. The numeral 20 denotes an evaporator to which the outlet port of refrigerant flow control 18 is connected. That evaporator can be a finned or bare surface coil, a refrigeration plate, or any standard refrigeration evaporator. A low pressure line extends between the outlet of evaporator 20 and the inlet port of compressor 10. With the exception of the interpositioning of the check valve 14 between the outlet of condenser 12 and the inlet of receiver 16, and with the exception that a large charge of refrigerant is used in that system, the refrigeration system of FIG. 1 is a standard and conventional refrigeration system.

The numeral 22 denotes an electrical heating element that is disposed within the receiver 16 and that is located adjacent the bottom of that receiver. A blanket type electric heater is preferred. One terminal of the electric heater is connected to one of the leads 26 which are, in turn, connected to a power source, not shown; and the other terminal of that electric heater is connected to one terminal of a switch 24. The other lead 26 is connected to the other terminal of the switch 24. That switch can be temperature-responsive or pressure-responsive, but in either event it will be arranged to respond to the condition of the liquid refrigerant in the receiver 16.

During normal operating conditions, the air passing over the condenser 12 will be cooler than the refrigerant in the condenser 12 but will not be so cold that it will unduly reduce the pressure level in that condenser and in the receiver 16. That air will extract heat from the gaseous refrigerant entering the condenser and permit it to condense into liquid; and that liquid refrigerant will then drain into the receiver 16. That liquid refrigerant will maintain a desired pressure level at the inlet port of the refrigerant flow control 18; and hence that refrigerant flow control will be able to operate efficiently. During normal operating conditions, the check valve 14 will remain open and the electric heater 22 will remain de-energized; and the overall refrigeration system will operate in the manner of a standard refrigeration system.

However, when the air passing over the condenser 12 becomes cold, the refrigerant in the condenser 12 and in the receiver 16 will be cooled to the point where it will be unable to maintain the desired pressure at the inlet port of the refrigerant flow control 18. At such time, the switch 24 will close its contacts and will energize the electric heater 22, thereby heating the liquid refrigerant in the receiver 16. The heating of that refrigerant will cause the pressure within the receiver 16 to increase, and that increase in pressure will cause the check valve 14 to close. Thereupon, further flow of liquid refrigerant from the condenser 12 into the receiver 16 will be prevented, and any flow of refrigerant from that receiver back into that condenser will be prevented. The switch 24 will keep the electric heater 22 energized until the pressure of the refrigerant in the receiver 16 reaches a predetermined level, and then it will re-open to de-energize that electric heater.

The blocking of the further flow of liquid refrigerant from condenser 12 into receiver 16 will not halt the operation of the compressor 10; and that compressor will continue to introduce gaseous refrigerant into the condenser 12. That refrigerant will condense to liquid and will begin to fill that condenser. That liquid refrigerant in the condenser will reduce the available area through which the cold air can absorb heat from the gaseous refrigerant; and as more and more refrigerant condenses and fills the condenser, the effective heat-transferring capacity of the condenser 12 will be reduced considerably. Continued operation of the compressor 10 and continued blocking of the flow of liquid refrigerant into the receiver 16 will eventually reduce the effective heat-transferring capacity of the condenser 12 to the point where the refrigerant pressure within the condenser 12 will approach the level of the refrigerant pressure within the receiver 16.

At such time, the check valve 14 will open and permit some of the liquid refrigerant in the condenser 12 to drain into the receiver 16. That valve will remain open, and thereby permit further liquid refrigerant to flow into the receiver 16, as long as the pressure of the refrigerant within that receiver remains above the level at which the switch 24 closes its contacts. However, whenever that pressure again falls below that level, the switch 24 will re-close its contacts and thereby re-energize the electric heater 22; and thereupon the check valve 14 will close once again. The heating of the liquid refrigerant by the electric heater 22 and the closing of the valve 14 will again raise the pressure in the receiver 16 to the desired level. In this way, the present invention keeps the pressure at the inlet port of the refrigerant flow control 18 from falling too low.

Referring to FIG. 2, the numeral 30 denotes a refrigerant compressor, and the outlet port of that compressor is connected to a T-junction 31. One arm of that T-junction is connected to a valve 32 which can be temperature-responsive or pressure-responsive or electrically-controlled. The other arm of the T-junction 31 is connected to a loop 34 which terminates at a T-junction 33 at the far side of the valve 32. The outlet of the valve 32 is connected to another of the arms of the T-junction 33; and the remaining arm of the T-junction 33 is connected to the inlet of an air-cooled condenser 36. A check valve 38 is connected to the outlet of the condenser 36 and to the inlet of a receiver 40. The outlet of the receiver 40 is connected to the inlet of a refrigerant flow control 42, and the outlet of that refrigerant flow control is connected to an evaporator 44. A low pressure line extends between the outlet of the evaporator 44 and the inlet port of the refrigeration compressor 30. A tube 46 extends between the valve 32 and the receiver 40, and it enables that valve to respond to refrigerant temperatures or pressures in that receiver.

Except for the valve 32, the loop 34, the T-junctions 31 and 33, the check valve 38, and the tube 46, and except for the fact that a larger-than-usual charge of refrigerant is used, the refrigeration system shown in FIG. 2 is a standard and usual refrigeration system.

As long as the pressure or temperature within the receiver 40 is above a predetermined value, that refrigeration system will operate in the way in which standard and usual refrigeration systems operate. However, whenever the pressure or temperature in that receiver falls below that predetermined level, the valve 32 will close and divert the hot gaseous refrigerant through the loop 34. That loop will normally pass little or no refrigerant, but when the valve 32 closes, all of the refrigerant will pass through the loop 34. In doing so, that refrigerant will transfer part of its heat to the liquid refrigerant in the receiver 40 and thereby increase the pressure in that receiver. That increased pressure will cause the check valve 38 to close, and will also increase the pressure at the inlet port of the refrigerant flow control 42. When the pressure or temperature within the receiver 40 rises to a predetermined level, the valve 32 will reopen and the refrigerant will pass directly from the outlet port of the compressor 30 to the inlet of the air-cooled condenser 36. That refrigerant will condense to liquid and will begin to fill the condenser 36, thereby reducing the effective heat-transferring capacity of that condenser. When enough refrigerant has condensed in the condenser 36, the effective heat-transferring capacity of that condenser will be reduced to the point where the incoming gaseous refrigerant will be able to raise the pressure within the condenser to the level of the pressure within the receiver. Thereupon the check valve 38 will open and permit liquid refrigerant to flow once again, into the receiver 40. That check valve will remain open as long as the pressure or temperature within the receiver 40 is above a predetermined level; but if that pressure or temperature falls below that level, the valve 32 will again close, thereby again causing hot, gaseous refrigerant to pass through the by-pass 34 and heat the refrigerant in the receiver 40 until the valve 38 closes and the pressure in that receiver rises. In this way, the control system of FIG. 2 will maintain a predetermined minimum pressure at the inlet of the refrigerant flow control 42.

The difference between the control systems of FIGS. 1 and 2 is that the control system of FIG. 1 provides electric heating of the liquid refrigerant in the receiver, whereas the control system of FIG. 2 heats that liquid refrigerant by the hot gaseous refrigerant of the system. The switch 24 and the valve 32 could, because of the relation between the pressure and temperature of refrigerant, be made responsive either to the temperature or the pressure of the refrigerant in the receivers 16 and 40.

If desired, pressure-differential valves, solenoid valves and other valves could be substituted for the check valves 14 and 38. The prime requirement of the valves 14 and 38 is that they isolate the receiver from the condenser whenever it is necessary to supply heat to the refrigerant in the receiver. Also, if desired and if available, a free-draining steam line could be used as the source of heat for the refrigerant in the receivers 16 and 40.

Whereas the drawing and accompanying description have shown and described two preferred embodiments of the present invention it should be apparent to those skilled in the art that various changes may be made in the form of the invention without affecting the scope thereof.

What I claim is:

1. A control device for a refrigeration system, which has an air-cooled condenser and a receiver, that is adapted to maintain a predetermined minimum pressure at the inlet port of the refrigerant flow control of said system and that comprises a source of heat for the refrigerant within said receiver, a valve intermediate the outlet of said condenser and the inlet of said receiver, and a control element that selectively causes said source of heat to heat said refrigerant in said receiver to raise the pressure of said refrigerant, said valve selectively isolating said receiver from said condenser to enable said source of heat to raise the pressure of said refrigerant in said receiver, said source of heat being a line through which hot gaseous refrigerant can pass.

2. A control device for a refrigeration system including a compressor, a condenser, a receiver, a port at the inlet of the refrigerant flow control of said system, and a normally open pressure responsive valve between the condenser and the receiver, said valve closing upon increase of pressure in the receiver, said control being adapted to maintain a predetermined minimum pressure at the inlet port of the refrigerant flow control of said system and that comprises a source of heat for the refrigerant within said receiver and a control element responsive to pressure changes in the receiver that selectively causes said source of heat to apply heat to said refrigerant in said receiver to raise the pressure of said refrigerant in said receiver, said source of heat being a line through which hot gaseous refrigerant can pass, said control element controlling the flow of hot gaseous refrigerant through said line.

3. A control device for a refrigeration system including a compressor, a condenser, a receiver, a port at the inlet of the refrigerant flow control of said system, and a normally open pressure responsive valve between the condenser and the receiver, said valve closing upon increase of pressure in the receiver, said control being adapted to maintain a predetermined minimum pressure at the inlet port of the refrigerant flow control of said system and that comprises a source of heat for the refrigerant within said receiver and a control element that selectively causes said source of heat to apply heat to said refrigerant in said receiver to raise the pressure of said refrigerant in said receiver, said source of heat being a line through which hot gaseous refrigerant can pass, said control element being a second valve responsive to the condition of the refrigerant in said receiver and responding to that condition to force hot gaseous refrigerant to pass through said line whenever the pressure at said inlet port of said refrigerant flow control falls too far.

4. The method of maintaining a predetermined minimum pressure at the inlet port of a refrigerant flow control for a compression-expansion refrigeration system, which has an air-cooled condenser and a receiver, that comprises applying heat to the liquid refrigerant in said receiver whenever the pressure of said refrigerant within said receiver falls below a predetermined level and isolating said receiver from said condenser by limiting the flow of liquid refrigerant out of said condenser to enable said heat to increase the pressure within said receiver and to enable gaseous refrigerant to condense in said condenser and thereby reduce the effective heat-transferring capacity of said condenser.

5. The method of maintaining a predetermined minimum pressure at the inlet port of a refrigerant flow control for a refrigeration system, which has an air-cooled condenser and a receiver, that comprises applying heat to the liquid refrigerant in said receiver whenever the pressure of said refrigerant within said receiver falls below a predetermined level and limiting the flow of liquid refrigerant out of said condenser and applying the resultant increase in pressure of the refrigerant in said receiver to the inlet port of said refrigerant flow control.

6. The method of maintaining a predetermined minimum pressure at the inlet port of a refrigerant flow control for a refrigeration system, which has an air-cooled condenser and a receiver, that comprises introducing heat into the bottom of the receiver to heat the liquid refrigerant in said receiver and isolating said receiver from said condenser to start filling said condenser with liquid refrigerant.

7. A control device for a refrigeration system, which has a condenser and a receiver for condensed refrigerant, that comprises
   (a) an electric heater disposed within said receiver adjacent the bottom of that receiver,
   (b) a pressure-responsive check valve that has the inlet port thereof connected to the outlet of said condenser and that has the outlet port thereof connected to the inlet of said receiver,
   (c) and a pressure-responsive electric switch that is connected to said electric heater,
   (d) said check valve remaining open whenever the pressures on the refrigerant in said condenser and in said receiver are approximately equal,
   (e) said check valve responding to pressures on the refrigerant in said receiver, whenever said pressures appreciably exceed the pressures on the refrigerant in said condenser, to close and prevent further flow of condensed refrigerant from said condenser into said receiver,
   (f) said electric switch remaining open and thereby keeping said electric heater de-energized as long as the pressures on the refrigerant in said receiver are above a predetermined value,
   (g) said electric switch responding to decreases in the pressures on the refrigerant in said receiver to close and thereby energize said electric heater,
   (h) said electric heater responding to the energization thereof to heat refrigerant in said receiver and generate pressures on the refrigerant in said receiver, until said pressures on said refrigerant in said receiver appreciably exceed the pressures on the refrigerant in said condenser, and thereby cause said check valve to close, (i) said check valve remaining closed until enough condensed refrigerant accumulates in said condenser to reduce the heat-exchanging capacity of said condenser sufficiently to enable the pressure on the refrigerant in said condenser to rise until it approaches the pressures on the refrigerant in said receiver.

8. A control device for a refrigeration system, which has a condenser and a receiver for condensed refrigerant, that comprises (a) an electric heater for heating refrigerant in said receiver, (b) a pressure-responsive check valve that has the inlet port thereof connected to the outlet of said condenser and that has the outlet port thereof connected to the inlet of said receiver, (c) and a pressure-responsive electric switch that is connected to said electric heater, (d) said check valve being adapted to permit condensed refrigerant to flow from said condenser into said receiver whenever the pressures on the refrigerant in said condenser and in said receiver are approximately equal, (e) said check valve responding to pressures on the refrigerant in said receiver, whenever said pressures appreciably exceed the pressures on the refrigerant in said condenser, to close and prevent further flow of condensed refrigerant from said condenser into said receiver, (f) said electric switch remaining open and thereby keeping said electric heater de-energized as long as the pressures on the refrigerant in said receiver are above a predetermined value, (g) said electric switch responding to decreases in the pressures on the refrigerant in said receiver to close and thereby energize said electric heater, (h) said electric heater responding to the energization thereof to heat refrigerant in said receiver and generate pressures on the refrigerant in said receiver, and thereby cause said check valve to close, (i) said check valve remaining closed until enough condensed refrigerant accumulates in said condenser to reduce the heat-exchanging capacity of said condenser.

9. A control device for a refrigeration system, which has a condenser and a receiver for condensed refrigerant, that comprises (a) a source of heat for heating refrigerant in said receiver, (b) a check valve that is intermediate the outlet port of said condenser and the inlet port of said receiver, (c) said check valve being adapted to permit condensed refrigerant to flow from said condenser into said receiver whenever the pressures on the refrigerant in said condenser and in said receiver are approximately equal, (d) said check valve responding to pressures on the refrigerant in said receiver, whenever said pressures appreciably exceed the pressures on the refrigerant in said condenser, to close and prevent further flow of condensed refrigerant from said condenser into said receiver, (e) and a control element that selectively causes said source of heat to heat said refrigerant in said receiver, (f) said source of heat selectively heating refrigerant in said receiver and thereby generating pressures on said refrigerant in said receiver and thereby causing said check valve to close, (g) said check valve remaining closed until enough condensed refrigerant accumulates in said condenser to reduce the heat-exchanging capacity of said condenser.

10. A control device for a refrigeration system, which has a compressor, condenser and receiver for condensed refrigerant in the order named, (a) a differential condition control valve intermediate of the outlet port of said condenser and the inlet port of said receiver and responsive to changes in condition in said receiver, (b) said valve normally being open to pass condensed refrigerant from the condenser to the receiver, (c) a source of heat for heating the refrigerant in said receiver, (d) control element means that selectively cause said source of heat to heat said refrigerant in said receiver to change conditions therein by increasing the temperature of and pressure on the refrigerant, (e) said valve closing upon the change of conditions in the receiver and causing condensed refrigerant to accumulate in said condenser.

References Cited in the file of this patent
UNITED STATES PATENTS

| | | |
|---|---|---|
| 2,359,595 | Urban | Oct. 3, 1944 |
| 2,510,881 | Gerteis | June 6, 1950 |
| 2,882,695 | Zwickl | Apr. 21, 1959 |
| 2,901,894 | Zearfoss | Sept. 1, 1959 |